W. D. BARTLETT.
APPARATUS FOR WELDING BY ELECTRICITY.
APPLICATION FILED APR. 24, 1911.

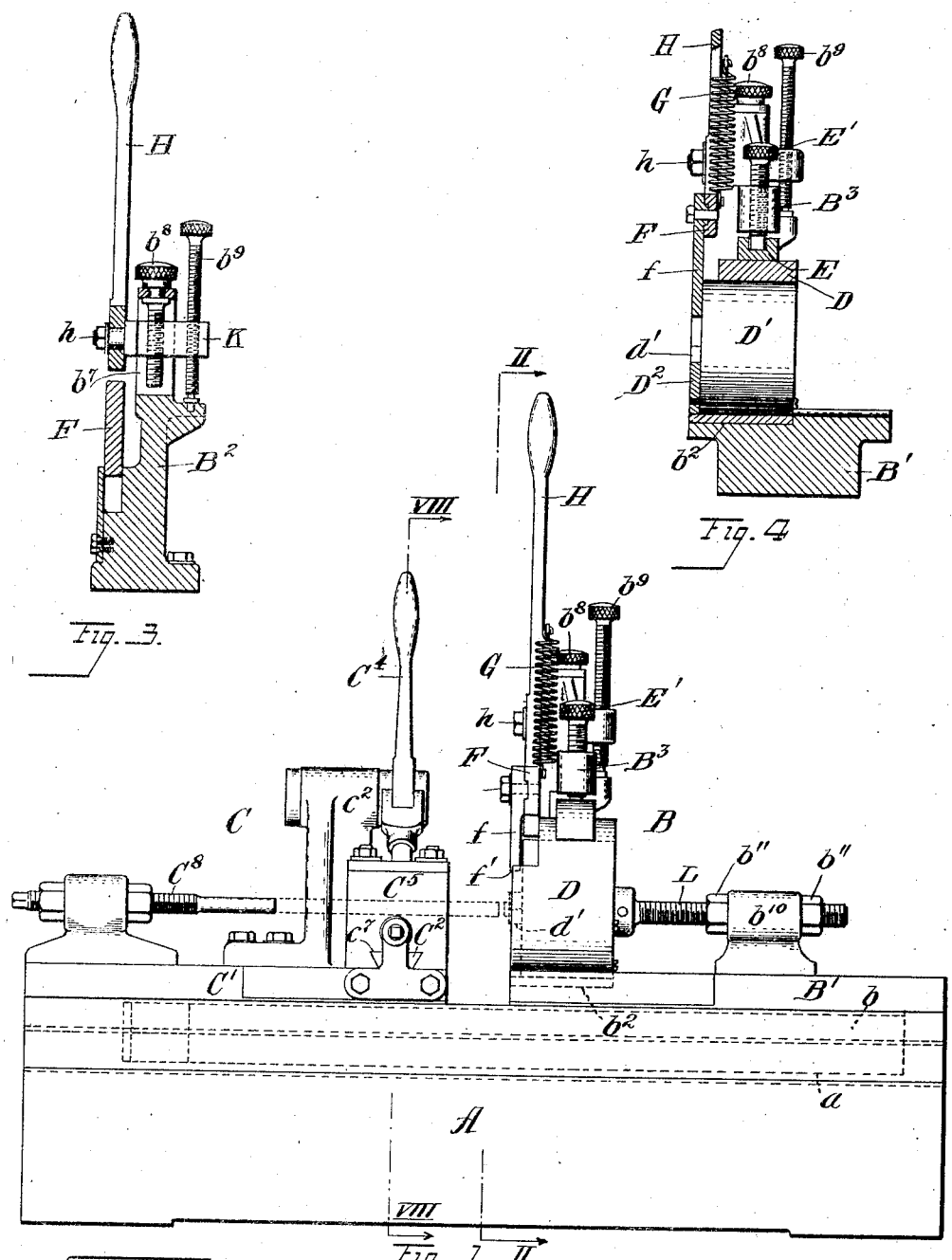

1,048,642. Patented Dec. 31, 1912.
3 SHEETS—SHEET 2.

Witnesses
Herman Eisele
[signature]

Inventor:
William D. Bartlett
By [signature]
his Attorney.

W. D. BARTLETT.
APPARATUS FOR WELDING BY ELECTRICITY.
APPLICATION FILED APR. 24, 1911.

1,048,642.

Patented Dec. 31, 1912.

UNITED STATES PATENT OFFICE.

WILLIAM D. BARTLETT, OF CLEVELAND, OHIO, ASSIGNOR TO THE ELECTRIC WELDING PRODUCTS COMPANY, OF CLEVELAND, OHIO, A CORPORATION OF OHIO.

APPARATUS FOR WELDING BY ELECTRICITY.

1,048,642.  Specification of Letters Patent.  Patented Dec. 31, 1912.

Application filed April 24, 1911. Serial No. 622,983.

*To all whom it may concern:*

Be it known that I, WILLIAM D. BARTLETT, a citizen of the United States, resident of Cleveland, county of Cuyahoga, and State of Ohio, have invented a new and useful Improvement in Apparatus for Welding by Electricity, of which the following is a specification, the principle of the invention being herein explained and the best mode in which I have contemplated applying that principle, so as to distinguish it from other inventions.

My present invention relates to apparatus for welding by electricity, such as my invention shown, described and claimed in Patent No. 915,249, issued March 16, 1909, and has for its object the provision of means whereby such welding process may be carried out in an economical and efficient manner.

The said invention consists of means which are hereinafter fully described and particularly set forth in the claims.

The annexed drawings and the following description set forth in detail certain means embodying my invention, the disclosed means, however, constituting but one of various mechanical forms in which the principle of the invention may be employed.

Figure 5:
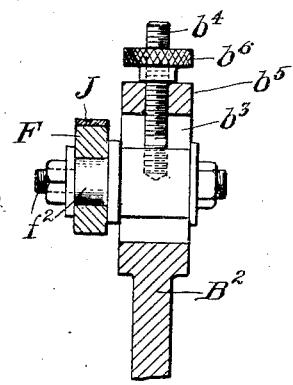
Figure 6:
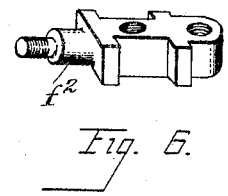
Figure 2:
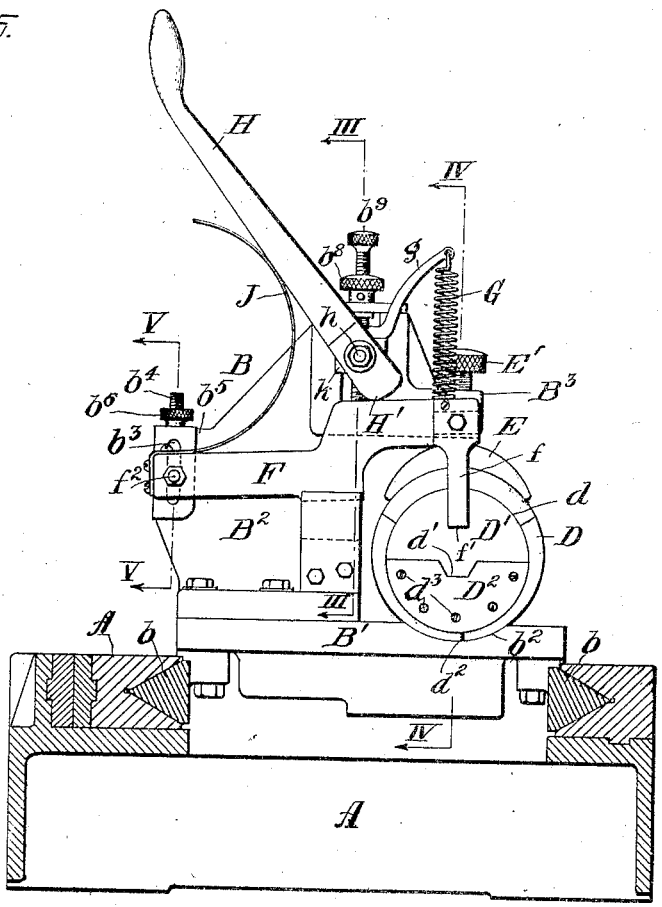
Figure 7:
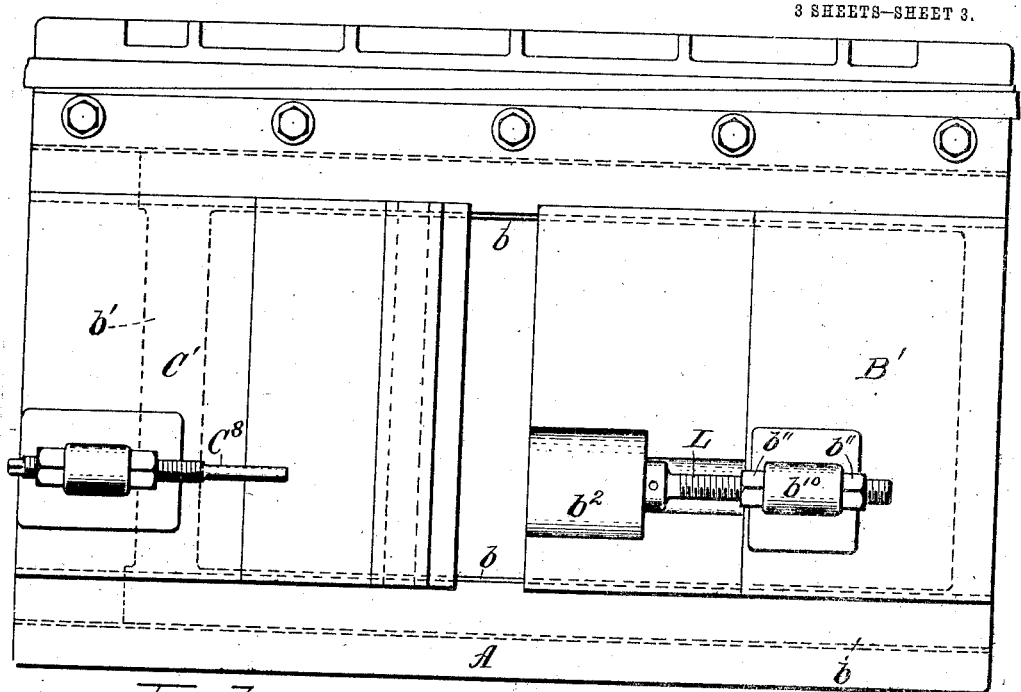
Figure 8:
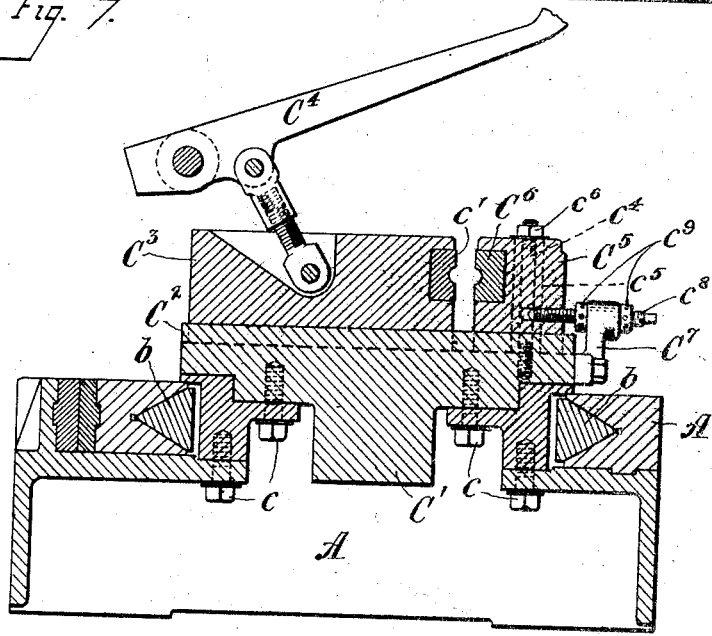

In said annexed drawings:—Figure 1 is a front elevation of a machine embodying my invention. Fig. 2 is a vertical cross-section taken upon the plane indicated by line II—II in Fig. 1. Figs. 3 and 4 are detail sections taken upon the planes indicated respectively by lines III—III and IV—IV in Fig. 2. Fig. 5 is a detail section upon an enlarged scale, taken upon the plane indicated by line V—V in Fig. 2. Fig. 6 is a perspective view on an enlarged scale of a detail part of the machine. Fig. 7 is a plan of the main frame of the machine, with parts of the welding-heads removed, and disclosing the main frame members of such heads. Fig. 8 is a cross-sectional view taken upon the plane indicated by line VIII—VIII in Fig. 1.

The machine consists primarily of three main parts, namely the main frame A, the movable welding-head B, and the stationary welding-head C. These welding-heads are each connected with the terminals (not shown) of the secondary coil of a transformer such as is usually used in this class of devices, and the structure and operation of which are well known to those skilled in the art. As in other machines of this class, the two elements which are to be welded together are clamped respectively in the welding-heads, whereupon the reciprocable member is moved toward the stationary member until contact and sufficient pressure are established, to enable a welding current passing across the gap to effect the required weld.

The machine illustrated in the drawings is designed particularly for welding bolt-heads to bolt-shanks. The movable welding-head B is arranged to receive and hold the bolt-head, and the stationary welding-head C is arranged to receive and hold the bolt-shank.

The welding-head B comprises in its structure a main frame member B', which is provided with slides $b\ b$ mounted in grooves or slideways $a\ a$ formed in and running longitudinally of the main frame A, as shown in dotted lines in Figs. 1 and 7, and in cross-section in Fig. 2. These slideways are preferably formed upon the interior of the main frame A, as shown, and the slides $b$ are preferably cast integral with the main frame member B'. Suitable means (not shown), are provided and connected with the member B' for reciprocating the welding-head B in the slideway $a$. As is usual, these reciprocating means are operated manually, as will be readily understood.

The welding-head C is placed at a suitable point on the frame A, as shown in Fig. 1, and is fixedly secured to such frame by means of bolts $c\ c$, as shown in Fig. 8. As is shown, the slides $b$ extend substantially the full length of the frame member B' and beyond said frame member to the left so as to extend a considerable distance under the welding-head C, as shown in dotted lines in Fig. 1, the slideways $a\ a$ being made to extend substantially the entire length of the frame A. The left hand or free ends of these slides are connected with each other by means of a brace or cross-piece $b'$, which is preferably cast integral with the slides and as shown in Fig. 7. By this means, it will be seen that the sliding welding-head B has an extremely long bearing on the frame, and as a consequence its deviation from a straight line during its travel is reduced to a minimum, and the desired registration of the two members to be welded thereby repeatedly obtained, after the two heads have been properly alined to effect such registration.

I will now describe the details of the mechanism which have for their object such proper above-mentioned alinement of the welding-heads, that is, the proper alinement of the clamping jaws which hold the two members to be welded. Intersecting the left hand end and upper surface of the frame member B' on the welding-head B, Figs. 1, 2 and 7, is a segmental cylindrical surface $b^2$ which forms the journal bearing for a cylindrical sleeve D. This bearing $b^2$ has its axis parallel with the direction of travel of the welding-head B, and when the sleeve D is seated therein the axis of the latter is also parallel with such direction of travel. This sleeve is provided with the interior cylindrical bearing surface $d$, whose axis, however, is eccentric with respect to but parallel with the axis of the sleeve D, and seated in this bearing surface is a cylindrical member D', to which is secured, by means of removable screws $d^3$, the stationary clamping jaw $D^2$ of the welding-head B. In the machine illustrated, this clamping jaw is provided with a semi-hexagonal seat $d'$ to receive the hexagonal head of a bolt.

Fixedly secured to the frame member B' is a secondary frame member $B^2$, which forms a support for various parts of the head which will be hereinafter described. The sleeve D is split, as shown at $d^2$, and resting upon the top thereof is a clamping saddle E, as shown in Figs. 1, 2 and 4. This saddle is engaged by a thumb-screw E', which is threaded in the end of an extension $B^3$ of the frame member $B^2$. By screwing down this thumb-screw, the saddle is caused to clamp the sleeve D in its bearing $b^2$, and also effect the contraction of this sleeve so as to fixedly secure the member D' therein. By loosening the clamping saddle E, the sleeve D may be rotated and thereby raise or lower the axis of the cylindrical member D'. When such change of location brings the bottom of the hexagonal seat $d'$ out of a horizontal plane, the member D' may be rotated within the sleeve D, without rotating this sleeve, while the saddle is still in its loosened position, so as to cause said bottom to reassume such horizontal position, as will be readily understood. It will therefore be seen that the clamping jaw $D^2$ may be raised or lowered so as to assume positions in different horizontal planes, and adjusted so as to have the bottom of seat $d'$ in a horizontal position. It will be noted, however, that when the above-described arrangement takes place, the axis of member D' is displaced by being thrown out of lateral or transverse alinement, inasmuch as the rotation of the sleeve D causes such axis to rotate about the sleeve's axis and swing on a short arc. This movement therefore throws the clamping jaw $D^2$ and seat $d'$ also out of such alinement. Unless means are provided for compensating for this lateral or transverse displacement, it will be seen that the proper alinement of the clamping jaws of the two welding-heads can not be obtained, and to effect this compensation the welding-head C is arranged in a manner which I shall now describe. This welding-head C is provided, Fig. 8, with a main frame member C', on the upper surface of which is formed a transverse guide $C^2$. Slidably mounted on the rear portion of this guide is the movable clamping block $C^3$, in the front end of which is secured the clamping jaw $c'$. Suitable mechanism, the details of which are described in said above-named patent and do not form any part of this invention, and which includes the manually operable arm $C^4$, suitably pivoted on an upright portion $c^2$ of the frame-member C', is provided for reciprocating the block $C^3$ and said clamping jaw $c'$. Mounted upon the front portion of the guide $C^2$ is the stationary clamping block $C^5$, in whose rear face is seated and secured the stationary clamping jaw $C^6$. This block is held securely to the frame member C' by means of stud bolts $c^4$, $c^4$ which pass through elongated slots $c^5$ formed in the block, and nuts $c^6$ $c^6$. This block is also provided with a groove $c^7$, Fig. 1, which receives the guide $C^2$. Secured to the frame member C' is a bracket $C^7$, Fig. 8, in which is rotatably mounted an adjusting screw $c^8$, whose rear end is threaded into the block $C^5$, as shown. This screw is mounted in said bracket in a manner such that it is secured against longitudinal displacement, as for instance, by means of collars $c^9$. After loosening up the nuts $c^4$ $c^4$, it will be seen that by turning the screw $c^8$ the position of the block $C^5$ may be horizontally varied, and the amount of this variation may be made to correspond with the amount of lateral displacement of the clamping jaw $D^2$ of the welding-head B. It will therefore be seen that, by means of the above-described means, the seat $d'$ of jaw $D^2$ may be given the exact required height above the frame, and then by adjusting block $C^5$, jaw $C^6$ may be horizontally shifted to receive the proper transverse alining position.

Pivotally mounted upon the frame member B' of the welding-head B is an oscillatory arm F, Fig. 2, its pivotal axis being at the rear thereof, and its front or free end carrying the movable clamping jaw $f$. The lower end $f'$ of this jaw is flat, and adapted to engage the upper face of the bolt-head when placed in the stationary clamping jaw $D^2$. When in such engagement with the upper surface of the bolt-head, this lower end should be parallel with the bottom of seat $d'$. When the position of the clamping jaw $D^2$ is, however, as previously described, altered, it will be seen that such parallelism is destroyed inasmuch as the seat $d'$ is raised or lowered and contact between jaw $f$ and the upper surface of the bolt-head is effected at a different point in the path of movement of such jaw. Means are therefore provided for imparting to this end $f'$ the required parallelism. To effect this purpose, the pivotal pin $f^2$ of the arm F is made so that it may have imparted to it various positions vertically, and to this end it is mounted in a slot $b^3$, Fig. 5, and has projecting from its upper surface a screw $b^4$ fixedly secured thereto and projecting through a portion $b^5$ of the frame. A thumb-nut $b^6$ engages the screw above the frame, and by turning such nut it will be seen that the pivotal pin may be raised or lowered, to raise or lower pivoted end of the arm F. This movement, it will be seen, changes the position of the end $f'$ of the jaw $f$, and the latter may therefore be given the required parallel position.

The front end of the arm F is held normally in an elevated position by means of a spring G, the lower end of which is secured to such arm and the upper end of which is secured to a suitable fixed standard $g$. Engaging the upper surface of this arm F is a cam H′ formed upon the lower end of a manually operable clamping lever H. This lever is pivoted upon a pin $h$. When the upper end of the lever H is thrown back, it rests against a supporting spring J. When such upper end is pulled forward, the cam H′ engages the upper surface of the arm F so as to effect the downward movement of the clamping jaw $f$ to engage the upper surface of a bolt-head while seated in the stationary jaw $D^2$.

Inasmuch as the position, as previously described, of the pivotal axis of the arm F is changed to meet various requirements, it is necessary to provide means for changing the pivotal axis of the lever F, in order to maintain the proper relation between said arm and lever H. To this end, the pin $h$ is formed on a block K, Fig. 6, which slides in vertical guides $b^7$, Fig. 3. Into this crosshead is threaded a thumb-screw $b^8$, which is rotatably mounted in the adjoining portion of the frame of the welding-head, as shown in said Fig. 3. By turning this thumb-screw $b^8$, it will be seen that the block may be raised or lowered and the pivotal axis of the lever F thereby changed to meet the requirements. A locking-screw $b^9$ is also provided, for locking this block in position, as will be readily understood from an inspection of said Fig. 3. It will therefore be seen that the two welding-heads are mounted upon the frame so as to be movable relatively toward and from each other, and each head comprises in its structure a pair of clamping jaws, one of which jaws in each such pair is stationary, and the other movable, together with means for adjusting the position of each of the stationary jaws in directions which are transverse with relation to each other, the stationary jaw $C^6$ being adjustable horizontally, and the stationary jaw $D^2$ being adjustable vertically. It will, therefore, be seen that the exact required alinement of the two stationary jaws may be obtained, and therefore the exact required alinement of the two elements to be welded also obtained.

An adjustable backing-screw L is mounted upon the frame member B′ of the welding-head B, to assist the cylindrical member D′ in retaining its position under the pressure applied thereto during the welding operation. This screw is threaded into an upright $b^{10}$, forming an integral part of frame member B′, and is provided with locking nuts $b''$ $b''$ for retaining it in position. The head C is provided with the adjustable stop-member $C^8$ which is in alinement with the clamping jaws of this welding head. This stop-member permits the proper positioning of the bolt-shank in the stationary jaw, preparatory to the welding operation.

The operation of the above-described machine, after the necessary adjustments have been made, as previously described, is as follows: The two welding-heads are normally separated from each other, as shown in Fig. 1. The bolt-head to be welded on to a shank is then placed in the seat $d'$ of the stationary clamping jaw $D^2$, whereupon the upper end of the lever H is pulled forward to throw the arm F downwardly and cause the movable clamping jaw $f$ to engage the upper surface of the said bolt-head and clamp it securely in place. The movable clamping-block C is normally moved a distance from the stationary block $C^3$, so that the two clamping jaws $c'$ and $C^6$ are separated from each other, as shown in Fig. 8. A blank bolt-shank is now placed in the stationary clamping jaw $C^6$, and its left-hand end caused to abut the end of the stop $C^8$. The upper end of the arm $C^4$ is then pulled forward and the shank thereby securely clamped between said jaws.

The manually operable mechanism for moving the welding-head B is then used to move such welding-head toward the welding-head C and bring the previously described bolt-head and bolt-shank into the required contact, whereupon the current passes through these two elements, produces the necessary heat, and further operation of the manually operable means for moving the welding-head B produces the required pressure for effecting the desired weld.

Having fully described my invention, what I claim and desire to secure by Letters Patent is:—

1. In apparatus for welding by electricity, the combination with a suitable frame; of two welding-heads mounted upon said frame and relatively movable toward and from each other, each comprising in its structure a pair of clamping jaws, one of said jaws in each pair being stationary and the other movable, and means for adjusting the position of one of said stationary jaws to assume positions in different horizontal planes; and means for adjusting the position of the other of the said stationary jaws to assume positions in different vertical planes.

2. In apparatus for welding by electricity, the combination with a suitable frame; of two welding-heads mounted upon said frame so as to be relatively movable toward and from each other; one of said heads being provided with a pair of clamping-jaws, one of which is stationary and the other of which is movable, said stationary jaw being mounted upon a horizontal slideway placed transversely of said frame, and means for adjustably securing said stationary jaw in place on said slideway; the other of said heads being provided with a pair of clamping-jaws, one of which is movable and the other of which is stationary, said stationary jaw being mounted so as to be movable to assume positions in different horizontal planes; and means for securing said last-named jaw in such position.

3. In apparatus for welding by electricity, the combination with a suitable frame; of a welding-head mounted upon said frame and comprising in its structure a pair of clamping-jaws, one of which is stationary and the other of which is movable, a cylindrical sleeve mounted in said head so as to be capable of being adjusted in various positions about its axis, a cylindrical member eccentrically mounted in said sleeve, said stationary jaw being secured to such member, and means for fixing said sleeve in position and for securing said cylindrical member within said sleeve.

4. In apparatus for welding by electricity, the combination with a suitable frame; of a welding-head mounted upon said frame and comprising in its structure a sleeve having an outer cylindrical bearing surface mounted in a bearing formed upon said head, a cylindrical member eccentrically mounted in said sleeve, a clamping jaw fixedly secured to said member, means for fixedly securing said sleeve in its bearing and fixedly securing said member within said sleeve, and a movable clamping-jaw coöperating with said first-named clamping-jaw.

5. In apparatus for welding by electricity, the combination with a suitable frame; of a welding-head mounted upon said frame and comprising in its structure a stationary clamping-jaw, means for adjusting said jaw to assume various positions above said frame, a pivotally mounted arm carrying a second jaw movable toward and from said stationary jaw, and means whereby the pivotal axis of said arm may be adjusted to assume various positions above said frame.

6. In apparatus for welding by electricity, a welding-head comprising the combination of a main or body member provided with a cylindrical bearing-surface; a cylindrical split sleeve mounted in said bearing-surface and provided with an interior cylindrical bearing-surface eccentrically located with reference to the exterior surface; a cylindrical member mounted within said eccentric bearing surface; a clamping-jaw fixedly secured to said member; a clamp for securing said sleeve in its bearing and adapted to secure said cylindrical member in said sleeve; and a movable clamping-jaw adapted to coöperate with said first-named clamping-jaw.

7. In apparatus for welding by electricity, a welding-head comprising the combination of a stationary clamping-jaw; a pivotally mounted arm provided with a second clamping-jaw arranged to coöperate with said first-named jaw; means whereby the pivotal axis of said arm may be varied; a manually-operable cam-lever pivotally mounted and adapted to actuate said movable arm; and means whereby the positions of the pivotal axis of said cam lever may be varied.

8. In apparatus for welding by electricity, the combination of a suitable frame; a welding-head fixedly mounted longitudinally upon said frame; and a second welding head mounted so as to be reciprocable longitudinally upon said frame; said frame being provided with longitudinal slideways passing beneath said fixed welding-head, and said reciprocable welding-head being provided with a main frame member having slides mounted in said slideways, and extending beneath said fixed head.

Signed by me, this 21st day of April, 1910.

WILLIAM D. BARTLETT

Attested by—
WINIFRED WALTZ,
CURT B. MUELLER.